(12) United States Patent
Hainz et al.

(10) Patent No.: US 10,908,177 B2
(45) Date of Patent: Feb. 2, 2021

(54) MAGNETIC SPEED SENSOR WITH A DISTRIBUTED WHEATSTONE BRIDGE

(71) Applicant: Infineon Technologies AG, Neubiberg (DE)

(72) Inventors: Simon Hainz, Villach (AT); Johannes Guettinger, Lind Ob Velden (AT)

(73) Assignee: Infineon Technologies AG

( * ) Notice: Subject to any disclaimer, the term of this patent is extended or adjusted under 35 U.S.C. 154(b) by 0 days.

(21) Appl. No.: 16/924,528

(22) Filed: Jul. 9, 2020

(65) Prior Publication Data
US 2020/0341025 A1 Oct. 29, 2020

Related U.S. Application Data

(63) Continuation of application No. 15/912,985, filed on Mar. 6, 2018, now Pat. No. 10,732,194.

(51) Int. Cl.
*G01P 3/481* (2006.01)
*G01P 3/489* (2006.01)

(52) U.S. Cl.
CPC ............. *G01P 3/481* (2013.01); *G01P 3/489* (2013.01)

(58) Field of Classification Search
CPC .................................. G01P 3/481; G01P 3/489
See application file for complete search history.

(56) References Cited

U.S. PATENT DOCUMENTS

2011/0244599 A1\* 10/2011 Whig ................. G01R 33/0052
438/3

\* cited by examiner

*Primary Examiner* — Farhana A Hoque
(74) *Attorney, Agent, or Firm* — Design IP

(57) ABSTRACT

A magnetic sensor includes a first bridge circuit including a plurality of magnetic field sensor elements, each configured to generate a sensor signal in response to the magnetic field impinging thereon. The first bridge circuit is configured to generate a first differential signal based on sensor signals generated by the plurality of magnetic field sensor elements. The plurality of magnetic field sensor elements include a first, second, and third group of sensor elements. The first group is arranged at center region of the magnetic sensor, the second group is arranged at a first side region of the magnetic sensor and are displaced a first distance from the first group, and the third group is arranged at a second side region of the magnetic sensor, opposite to the first side region, and is displaced a second distance from the first group that is substantially equal to the first distance.

17 Claims, 6 Drawing Sheets

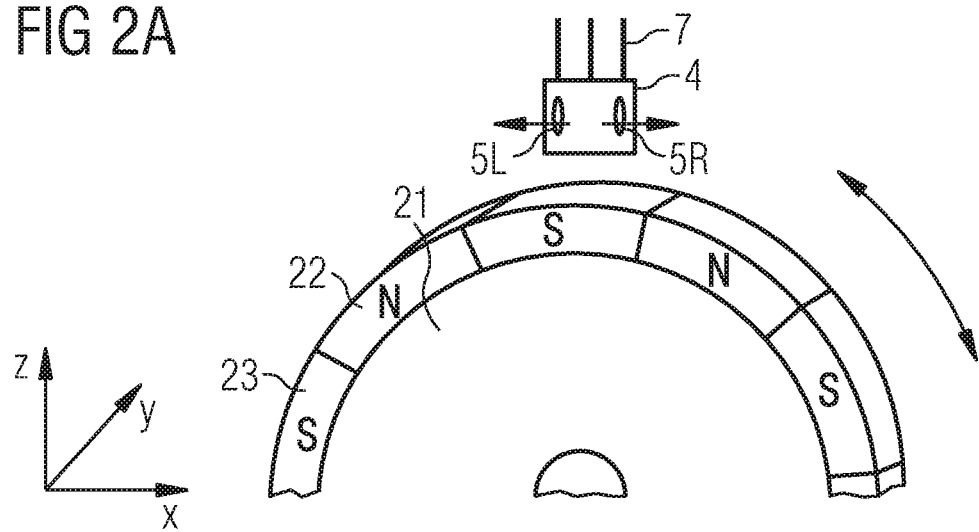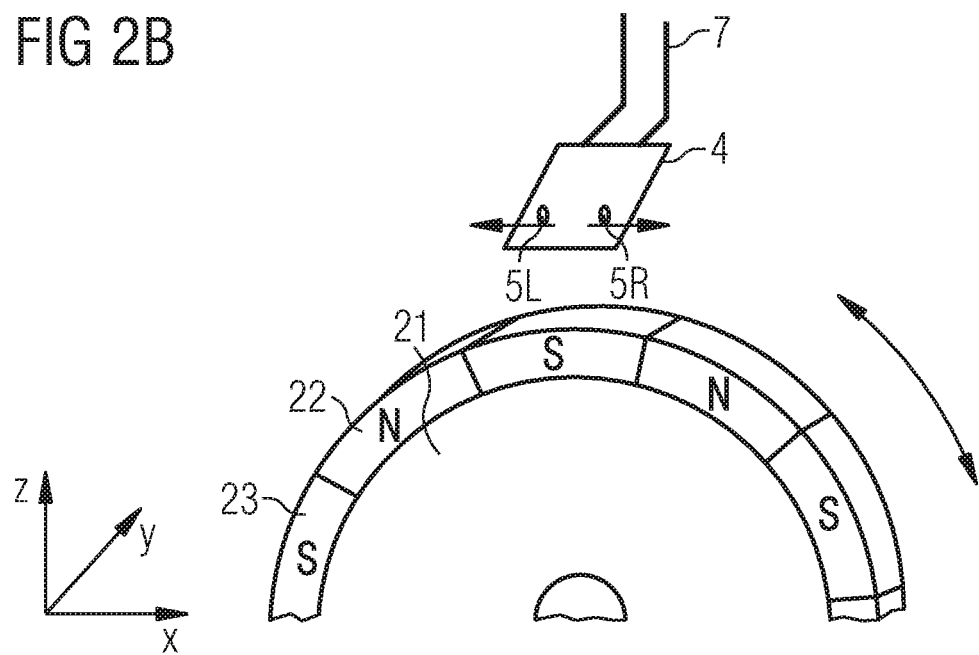

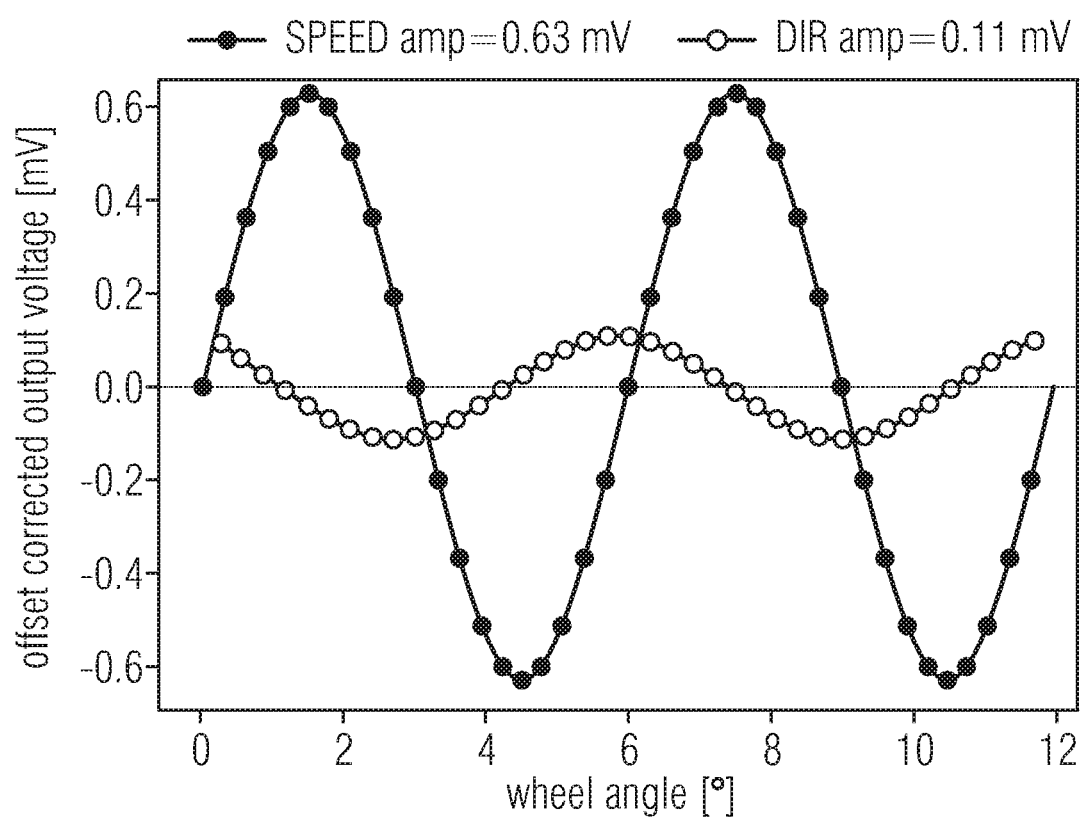

MAGNETIC SPEED SENSOR WITH A DISTRIBUTED WHEATSTONE BRIDGE

CROSS-REFERENCE TO RELATED APPLICATIONS

This application is a continuation of U.S. patent application Ser. No. 15/912,985 filed Mar. 6, 2018, which is incorporated by reference as if fully set forth.

FIELD

The present disclosure relates generally magnetic sensors, and, more particularly, to a magnetic speed sensor with a distributed Wheatstone bridge.

BACKGROUND

In the field of speed sensing, a sinusoidal signal may be generated by a magnetic sensor in response to a rotation of a target object, such as a wheel, camshaft, crankshaft, or the like. The sinusoidal signal may be translated into pulses, which is further translated into a movement detection or a speed output.

For example, in speed sensor applications, a speed signal path and a direction signal path may be used. Typically, the speed signal path measures the differential magnetic field on a left positioned sensing element and right positioned sensing element location. The direction path measures the magnetic field with a monocell sensor element placed at a center sensing location. With such a concept, a phase difference or phase shift between the speed signal and direction signal can be evaluated and the rotation direction can be determined from the phase shift. The use of moncells for direction detection has drawbacks in external field robustness and is more affected by electronic noise. Both aspects are getting more important for the implementation of sensors in hybrid and fully electric cars.

In some implementations, the same concept may be used for speed and direction. Two sensor Wheatstone bridges may be used, one for generating the speed signal and one for generating the direction signal, having a displacement between each other. However, a disadvantage with this configuration is that a phase shift between the signals equals the displacement of the two bridges. With a target wheel having a 20 mm pitch and a displacement of the bridges at 1 mm, the resulting phase shift is small (360°/20=18°). Even if the signal amplitude of the direction signal is large, the phase shift is too small to allow a good and robust direction detection.

Therefore, an improved device having better and more robust direction detection may be desirable.

SUMMARY

According an embodiment, a magnetic sensor includes a first bridge circuit comprising a first plurality of magnetic field sensor elements, each configured to generate a sensor signal in response to the magnetic field impinging thereon, where the first bridge circuit is configured to generate a first differential signal based on sensor signals generated by the first plurality of magnetic field sensor elements. The first plurality of magnetic field sensor elements include a first pair of sensor elements, a second pair of sensor elements, and a third pair of sensor elements. The first pair of sensor elements are arranged at center region of the magnetic sensor between the second pair of sensor elements and the third pair of sensor elements, the second pair of sensor elements are arranged at a first side region of the magnetic sensor and are displaced a first distance from the first pair of sensor elements, and the third pair of sensor elements are arranged at a second side region of the magnetic sensor, opposite to the first side region, and are displaced a second distance from the first pair of sensor elements that is substantially equal to the first distance.

According to another embodiment, a magnetic sensor includes a plurality of magnetic field sensor elements, each having a reference direction sensitive to a same magnetic field component of a magnetic field, and each configured to generate a sensor signal in response to the magnetic field impinging thereon; a first bridge circuit including a first group of sensor elements of the plurality of magnetic field sensor elements, where the first bridge circuit is configured to generate a first differential signal based on sensor signals generated by the first group of sensor elements; and a second bridge circuit including a second group of sensor elements of the plurality of magnetic field sensor elements, where the second bridge circuit is configured to generate a second differential signal based on sensor signals generated by the second group of sensor elements, the second differential signal being 90° phase shifted to the first differential signal.

BRIEF DESCRIPTION OF THE DRAWINGS

Embodiments are described herein making reference to the appended drawings.

FIGS. 2A and 2B illustrate a magnetic field sensing principle using a second type of magnetic encoder;

FIG. 7 illustrates waveforms for a speed sensor signal and a direction sensor signal according to one or more embodiments.

DETAILED DESCRIPTION

Figure 1A:
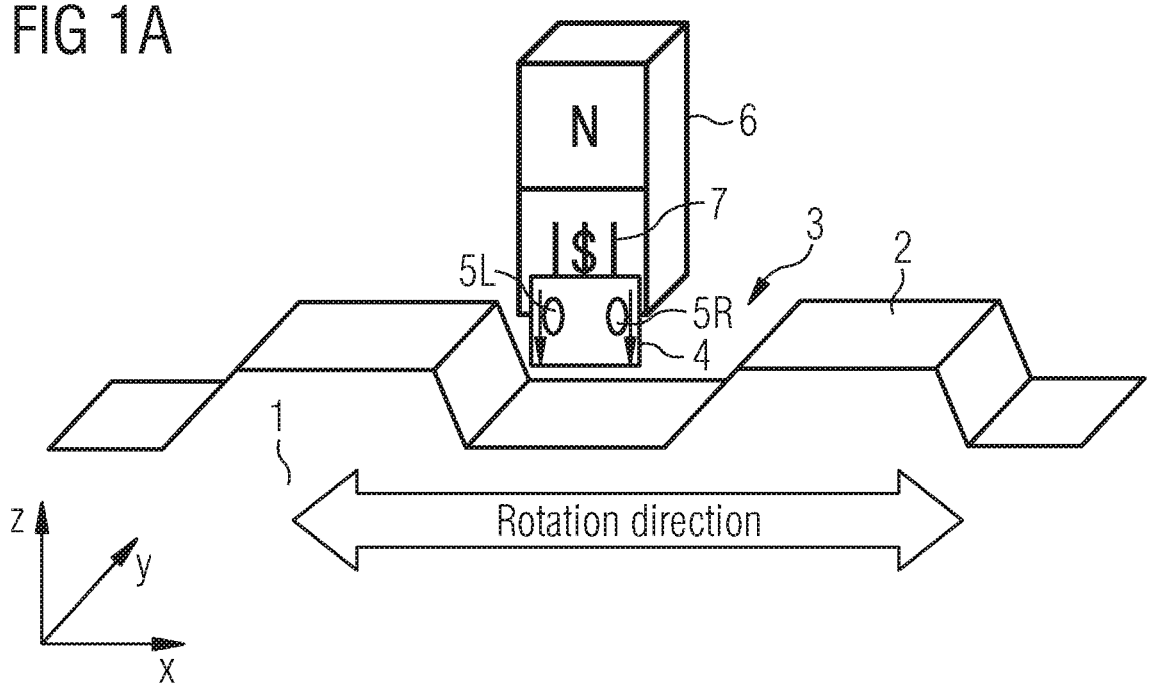
FIGS. 1A and 1B illustrate a magnetic field sensing principle using a first type of magnetic encoder.

In the following, various embodiments will be described in detail referring to the attached drawings. These embodiments are given for illustrative purposes only and are not to be construed as limiting. For example, while embodiments may be described as comprising a plurality of features or elements, in other embodiments, some of these features or elements may be omitted, and/or may be replaced by alternative features or elements. In other embodiments, further features or elements in addition to those explicitly shown or described may be provided. In addition, features of the different embodiments described hereinafter may be combined with each other to form further embodiments, unless specifically noted otherwise. For example, variations or modifications described with respect to one of the embodiments may also be applicable to other embodiments unless noted to the contrary.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Whenever a singular form such as "a," "an," and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes," and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. Functional blocks may be implemented in hardware, firmware, software, or a combination thereof.

Embodiments relate to sensors and sensor systems, and to obtaining information about sensors and sensor systems. A sensor may refer to a component which converts a physical quantity to be measured to an electric signal, for example, a current signal or a voltage signal. The physical quantity may for example comprise a magnetic field, an electric field, a pressure, a force, a current or a voltage, but is not limited thereto. A sensor device, as described herein, may be a an angle sensor, a linear position sensor, a speed sensor, motion sensor, and the like.

A magnetic field sensor, for example, includes one or more magnetic field sensor elements that measure one or more characteristics of a magnetic field (e.g., an amount of magnetic field flux density, a field strength, a field angle, a field direction, a field orientation, etc.). The magnetic field may be produced by a magnet, a current-carrying conductor (e.g., a wire), the Earth, or other magnetic field source. Each magnetic field sensor element is configured to generate a sensor signal (e.g., a voltage signal) in response to one or more magnetic fields impinging on the sensor element. Thus, a sensor signal is indicative of the magnitude and/or the orientation of the magnetic field impinging on the sensor element.

It will be appreciated that the terms "sensor" and "sensing element" may be used interchangeably throughout this description, and the terms "sensor signal" and "measurement signal" may be used interchangeably throughout this description.

Magnetic sensors, as provided herein, may be magnetoresistive sensors. Magnetoresistance is a property of a material to change the value of its electrical resistance when an external magnetic field is applied to it. Some examples of magnetoresistive effects are Giant Magneto-Resistance (GMR), which is a quantum mechanical magnetoresistance effect observed in thin-film structures composed of alternating ferromagnetic and non-magnetic conductive layers, Tunnel Magneto-Resistance (TMR), which is a magnetoresistive effect that occurs in a magnetic tunnel junction (MTJ), which is a component consisting of two ferromagnets separated by a thin insulator, or Anisotropic Magneto-Resistance (AMR), which is a property of a material in which a dependence of electrical resistance on the angle between the direction of electric current and direction of magnetization is observed. For example, in the case of AMR sensors, a resistance for an AMR sensor element changes according to a square of a sine of an angle of the magnetic field component projected on a sensing axis of the ARM sensor element.

The plurality of different magnetoresistive effects is commonly abbreviated as xMR, wherein the "x" acts as a placeholder for the various magnetoresistive effects. xMR sensors can detect the orientation of an applied magnetic field by measuring sine and cosine angle components with monolithically integrated magnetoresistive sensor elements.

Magnetoresistive sensor elements of such xMR sensors typically include a plurality of layers, of which at least one layer is a reference layer with a reference magnetization (i.e., a reference direction). The reference magnetization is a magnetization direction that provides a sensing direction corresponding to a sensing axis of the xMR sensor. Accordingly, if a magnetic field component points exactly in the same direction as the reference direction, a resistance of the xMR sensor element is at a maximum, and, if a magnetic field component points exactly in the opposite direction as the reference direction, the resistance of the xMR sensor element is at a minimum. A magnetic field component may be, for example, an x-magnetic field component (Bx), a y-magnetic field component (By), or a z-magnetic field component (Bz), where the Bx and By field components are in-plane to the magnetic sensor, and Bz is out-of-plane to the magnetic sensor.

In some applications, an xMR sensor includes a plurality of magnetoresistive sensor elements, which have different reference magnetizations. Examples of such applications, in which various reference magnetizations are used, are angle sensors, compass sensors, or specific types of speed sensors (e.g., speed sensors in a bridge arrangement).

By way of example, such magnetoresistive sensor elements are used in speed, angle or rotational speed measuring apparatuses, in which magnets may be moved relative to an magnetoresistive sensor elements and hence the magnetic field at the location of the magnetoresistive sensor element changes in the case of movement, which, in turn, leads to a measurable change in resistance.

According to one or more embodiments, a magnetic field sensor and a sensor circuit may be both accommodated (i.e., integrated) in the same chip package (e.g., a plastic encapsulated package, such as leaded package or leadless package, or a surface mounted device (SMD)-package). This chip package may also be referred to as sensor package. The sensor package may be combined with a back bias magnet to form a sensor module, sensor device, or the like.

The sensor circuit may be referred to as a signal processing circuit and/or a signal conditioning circuit that receives one or more signals (i.e., sensor signals) from one or more magnetic field sensor elements in the form of raw measurement data and derives, from the sensor signal, a measurement signal that represents the magnetic field. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a sensor output suitable for processing after conditioning.

Thus, the sensor circuit may include an analog-to-digital converter (ADC) that converts the analog signal from the one or more sensor elements to a digital signal. The sensor circuit may also include a digital signal processor (DSP) that performs some processing on the digital signal, to be discussed below. Therefore, the sensor package may include a circuit that conditions and amplifies the small signal of the magnetic field sensor element via signal processing and/or conditioning.

A sensor device, as used herein, may refer to a device which includes a sensor and sensor circuit as described above. A sensor device may be integrated on a single semiconductor die (e.g., silicon die or chip), although, in other embodiments, a plurality of dies may be used for implementing a sensor device. Thus, the sensor and the sensor circuit are disposed on either the same semiconductor die or on multiple dies in the same package. For example, the sensor might be on one die and the sensor circuit on another die such that they are electrically connected to each other within the package. In this case, the dies may be comprised of the same or different semiconductor materials, such as GaAs and Si, or the sensor might be sputtered to a ceramic or glass platelet, which is not a semiconductor.

Embodiments herein may employ one or more bridge circuits. As used herein, "bridge circuit," "bridge device," and "bridge" may be used interchangeably. A bridge circuit is a topology of electrical circuit in which two circuit branches (usually in parallel with each other) are "bridged" by a third branch connected between the first two branches at some intermediate point along them. A bridge circuit may include passive elements, such as resistive, capacitive, and inductive elements, or a combination thereof.

Magnetoresistive sensor elements of an xMR sensor are resistive elements that may be arranged in a bridge configuration. A resistive value of the one or more magnetic field sensor elements may change when exposed to a magnetic field. The resistive value, which corresponds to a characteristic of the magnetic field, may be measured such that information regarding the characteristic of the magnetic field is obtained. Further, the resistive value may be measured in the form of a voltage or current measurement. Thus, magnetic field sensor elements in an xMR sensor may be arranged in a bridge formation to provide a resistance value (e.g., in the form of a voltage output) corresponding to a measured characteristic of a magnetic field.

Magnetic field sensors provided herein may be configured for incremental speed, position measurement, and rotation direction detection of a rotating magnetic encoder, such as a magnetic encoder (e.g., wheel) or camshaft.

One type of magnetic encoder may be a ferromagnetic encoder, which may be a toothed wheel or a toothed disc of ferromagnetic material with holes or notches that pass in front of the magnetic field sensor. The magnetic field may be produced by a back bias magnet coupled to a back of the magnetic field sensor. Thus, the magnetic field pattern of the magnetic field produced by the back bias magnet is altered by the passing of teeth and notches of the rotating magnetic encoder. Hence, the strength of the of the magnetic field produced by the back bias magnet in certain sensing planes or sensing directions (e.g., x-, y-, and z-planes or directions) is altered according to the change in the magnetic field pattern.

A second type of magnetic encoder is an encoder wheel that consists of alternating magnets, which are magnetized in a opposite directions (e.g., alternating south-pole and north-pole magnets). In this case the incremental speed sensor is placed in front of the encoder and detects if the measured magnetic field changes its polarity. In this case, the speed sensor generates an output signal that indicates that a pole passed by.

Figure 1B:
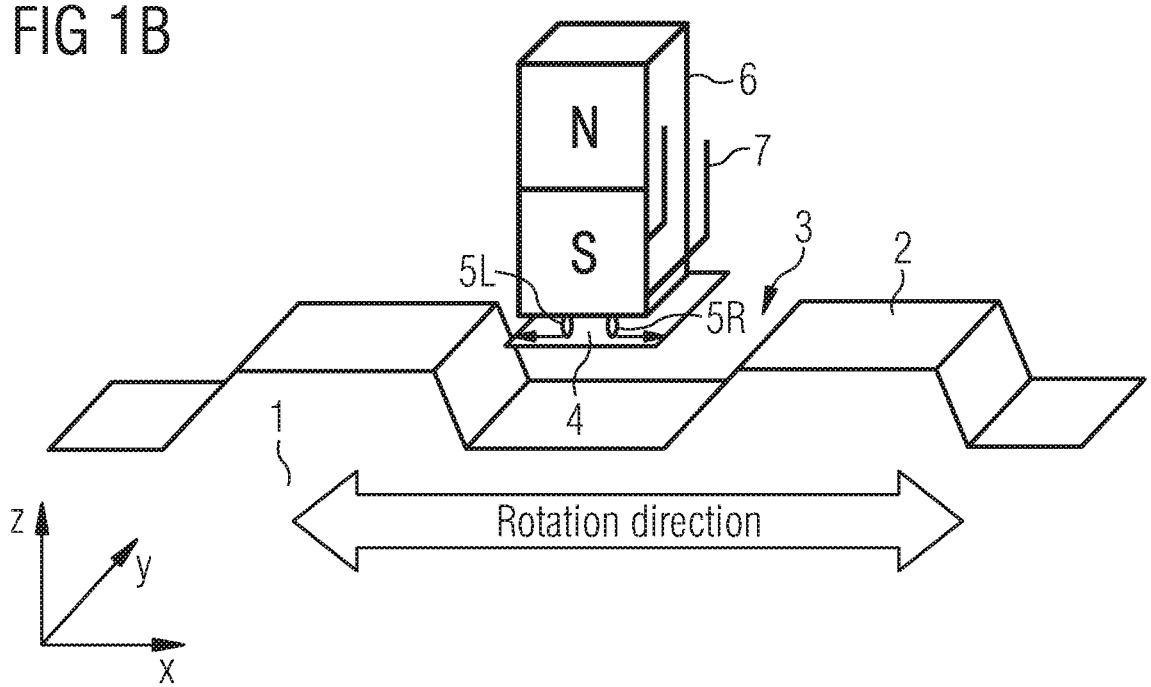

FIGS. 1A-1B and 2A-2B illustrate a magnetic field sensing principle according to one or more embodiments. In particular, FIGS. 1A and 1B illustrate a magnetic field sensing principle using a first type of magnetic encoder, and FIGS. 2A and 2B illustrate a magnetic field sensing principle using a second type of magnetic encoder.

FIGS. 1A and 1B show a toothed wheel 1 that may rotate in either rotation direction and has alternating teeth 2 and notches 3, according to one or more embodiments. In particular, the toothed wheel 1 may be made of a ferromagnetic material (e.g., iron) that attracts magnetic fields. In addition, a sensor arrangement 4 may include two sensor elements 5L and 5R that are configured to sense a magnetic field produced by a back bias magnet 6. Together, the sensor arrangement 4 and the back bias magnet 6 may comprise a sensor module. The sensor arrangement 4 may generally be referred to herein as sensor 4 and may further include a sensor circuit (not shown) and may be disposed in a sensor package.

As the toothed wheel 1 rotates, the teeth 2 and notches 3 alternate passing by the sensor module including the back bias magnet 6 and the sensor elements 5L and 5R. In the instance of a tooth 2 passing the sensor module, the magnetic field lines of the bias magnetic field produced by the back bias magnet 6 are pulled in the z-direction towards the tooth 2. Thus, the magnetic field lines are pulled away from the x- and y-planes and a sensed magnetic field strength in the x- and y-directions is reduced such that a minimum field strength in the in the x- and y-directions would be detected at the center of the tooth 2. In contrast, a sensed magnetic field strength in the z-direction is increased such that a maximum field strength in the z-direction would be detected at the center of the tooth 2. This may differ in real-world applications where the minimum may not occur exactly at the center due to assembly tolerances, but the minimum field strength should be detected substantially at the center of the tooth 2.

Conversely, in the instance of a notch 3 passing the sensor module, magnetic field lines of the bias magnetic field produced by the back bias magnet 5 are not pulled (or are less pulled) in the z-direction towards the notch 3. Thus, the magnetic field lines remain concentrated relative to the x- and y-planes and the sensed magnetic field strength in the x- and y-directions would be at a maximum in the x- and y-directions at the center of the notch 3. In contrast, a sensed magnetic field strength in the z-direction is reduced such that a minimum field strength in the z-direction would be detected at the center of the notch 2. This may differ in real-world applications where the maximum may not occur exactly at the center, but the maximum field strength should be detected substantially at the center of the notch 3.

FIG. 1A shows that the sensor arrangement 4 is provided in top read configuration such that sensor elements 5L and 5R are provided in front of the back bias magnet 6. Furthermore, the sensor elements 5L and 5R, as indicated by the adjacent arrows, have a reference direction aligned in a same sensing direction (e.g., the negative z-direction).

FIG. 1B, on the other hand, shows that the sensor arrangement 4 is provided in parallel read configuration such that the sensor elements 5L and 5R are provided between the back bias magnet 6 and the encoder wheel 1. Moreover, the sensor elements 5L and 5R are linearly aligned with or in parallel to a rotation direction of the toothed wheel 1. Here, the sensor elements 5L and 5R, as indicated by the adjacent arrows, have opposing reference directions aligned along a same sensing direction (e.g., the x-direction).

The two magnetic field sensor elements 5L and 5R in FIGS. 1A and 1B may be differential sensor elements. In such a differential configuration, the sensor signals of each differential sensor element 5L and 5R is provided to the sensor circuit that calculates a differential measurement signal using a differential calculation that may be used to cancel out homogeneous and/or non-homogenous stray-fields in the sensing axis of the xMR sensor. In addition, the differential sensor elements 5L and 5R may be disposed from center at a distance of about half of a pitch of wheel 1 in order to generate a differential measurement signal with high signal to noise ratio. That is, the distance between the differential sensor elements 5L and 5R, both being spaced about half a pitch from center, may be matched or substantially matched (e.g., within 5% to allow for manufacturing tolerances) to the pitch of the wheel 1. A pitch is the distance along a pitch circle between two adjacent teeth of a toothed wheel. However, it will be appreciated that other spacing arrangements are also possible. Lastly, leads 7 provide an electrical pathway for various input and output signals (e.g., power, command and output signals) to and from the sensor arrangement 4.

Using the parallel read configuration shown in FIG. 1B as an example, as the wheel 1 rotates, the teeth 2 and notches 3 alternate past the sensor module and the sensor elements 5L and 5R sense a change in the x-axis and y-axis magnetic field strength that varies as a sinusoidal waveform (i.e., as a signal modulation), the frequency of which corresponds to a speed of rotation of the wheel 1, and which further corresponds to a speed of rotation of a drive shaft (e.g., camshaft) that drives the rotation of the wheel 1. Thus, the sensor circuit of the sensor arrangement 4 receives signals (i.e., sensor signals) from the magnetic field sensor elements 5L and 5R and derives, from the sensor signals, a differential measurement signal that represents the magnetic field as a signal modulation. The differential measurement signal may then be output as an output signal to an external controller, control unit or processor (e.g., an electronic control unit (ECU)), or used internally by the sensor circuit for further processing (e.g., to generate a pulsed output signal) before being output to an external device. For example, the external device may count the pulses of the pulsed output signal and calculate a wheel-speed therefrom.

In addition, additional sensor elements (not shown) may be disposed on the sensor arrangement 4 to generate another differential sensor signal that may enable the sensor to determine a rotational direction of the wheel 1. As used herein, this other sensor signal will be referred to as a direction signal or direction sensor signal, whereas the first signal described in the preceding paragraph will be referred to as a speed signal or speed sensor signal.

FIGS. 2A and 2B illustrate a magnetic field sensing principle using a second type of magnetic encoder, a magnetized encoder wheel 21, according to one or more embodiments. Similar to FIGS. 1A and 1B, the sensor arrangements 4 shown in FIGS. 2A and 2B are arranged in a top read configuration and a parallel read configuration, respectively. Thus, similar to FIGS. 1A and 1B, the sensor arrangement 4 includes a sensor circuit (not shown) and two differential magnetic field sensor elements 5L and 5R.

The sensor signals of each differential sensor element 5L and 5R is provided to the sensor circuit that calculates a differential measurement signal using a differential calculation that may be used to cancel out homogeneous and/or non-homogenous stray-fields in the sensing direction. In addition, the differential sensor elements 5L and 5R may be disposed from center at a distance of about half of the pitch of the poles of the magnetized encoder wheel 21 in order to generate a differential measurement signal with high signal to noise ratio. That is, the distance between the differential sensor elements 5L and 5R, both being spaced about half a pitch from center, may be matched or substantially matched (e.g., within 5% to allow for manufacturing tolerances) to the pitch of the wheel 21. A pitch is the distance along a pitch circle between two poles of the same polarity (i.e., between two adjacent positive poles or two adjacent negative poles) for a magnetized encoder wheel. However, it will be appreciated that other spacing arrangements are also possible.

The magnetized encoder wheel 21 comprises alternating north pole sections 22 and south pole sections 23. Accordingly, the north pole sections 22 and south pole sections 23 represent teeth and notches of a tooth and notch wheel 1 described above. The sensor elements 5L and 5R of sensor arrangement 4, as described in reference to FIGS. 1A and 1B, are sensitive to magnetic fields influenced by the north pole sections 22 and south pole sections 23 of the wheel 21. Here, since the magnetic field is actively generated by the wheel 21, a back bias magnet can be omitted. A sensor output corresponds to the rotational speed of the magnetized encoder wheel 21 by detecting the change of the alternating magnetic field in a similar manner described with respect to FIGS. 1A and 1B. Thus, the sensor circuit of the sensor arrangement 4 generates a sensor output to be output by one of the leads 7.

Figure 3:
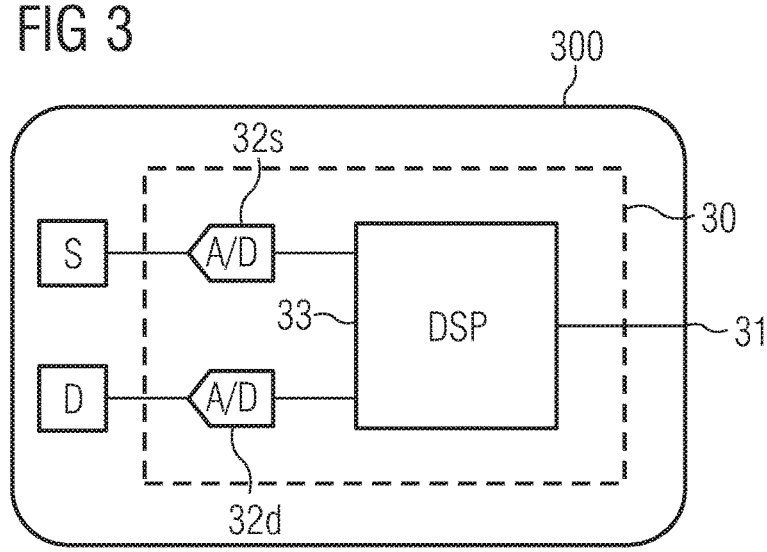
FIG. 3 shows schematic block diagram illustrating a magnetic speed sensor according to one or more embodiments.

FIG. 3 is a schematic block diagram illustrating a magnetic speed sensor 300 according to one or more embodiments. The magnetic speed sensor 300 includes sensor arrangement S and sensor arrangement D that are each configured to generate a sensor signal in response to a magnetic field impinging thereon. In particular, sensor arrangement S may be configured to generate a speed sensor signal and sensor arrangement D may be configured to generate a direction sensor signal that is phase shifted 90° or substantially 90° from the speed sensor signal. The phase shift between the speed signal and direction signal can be evaluated and the rotation direction of a target object can be determined based on whether the phase shift is positive or negative.

The sensor arrangements S and D shown in FIG. 3 may each represent a resistor bridge that includes a corresponding set of sensor elements that are arranged in a bridge configuration. Both sensor arrangements S and D are configured to measure magnetic fields according to a same sensing plane (e.g., x-plane, y-plane, or z-plane). That is, the sensor elements that make up the bridges have reference directions that are aligned with a same sensing plane.

The magnetic speed sensor 300 also includes a sensor circuit 30 that receives the sensor signals from the sensor arrangements S and D for processing and for generation of pulsed output speed signal and a direction indicator signal at output 31. The sensor circuit 30 includes two signal paths: an S signal path and a D signal path. The speed (S) signal on the S signal path may be in a form of a sinusoidal (sine) waveform that represents a speed of rotation of the target object, and the direction (D) signal on the D signal path may be a similar waveform that is phase shifted 90° from the speed signal. That is, direction signal is a sinusoidal (cosine) waveform that represents a speed of rotation of the target object, but is used by a digital signal processor 33 to determine the direction of rotation by analyzing the phase difference between the speed signal and the direction signal.

Figure 4:
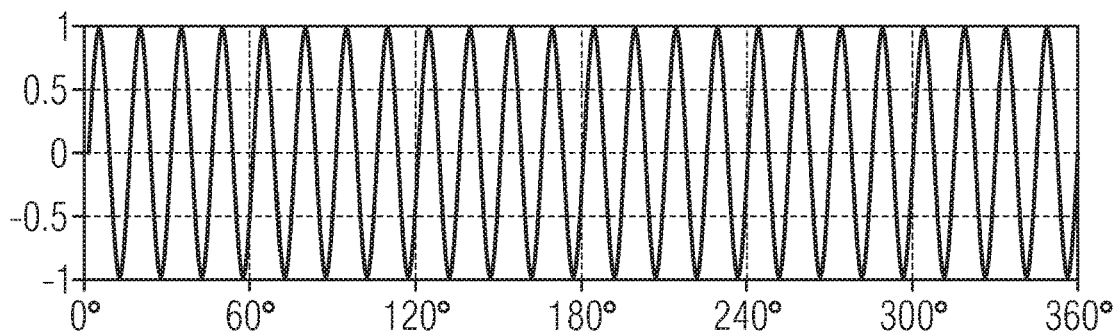
FIG. 4 shows an example of a sinusoidal waveform generated a sensor arrangement of a magnetic speed sensor according to one or more embodiments.

FIG. 4 is an example of a sinusoidal waveform generated by one of the sensor arrangements S and D of magnetic speed sensor. In particular, FIG. 4 shows a full revolution speed sensor signal response of one full revolution of an encoder wheel discussed above.

A pole pair includes adjacent north and south poles on a magnetized encoder wheel, or adjacent tooth and notch on a toothed wheel. Typically, for speed applications, the number of pole pairs of the magnetized target wheel, which also corresponds to a number of teeth on a tooth wheel, translates into a number of sine waveforms for a full revolution of 360°. For this example, the magnetized encoder wheel 21 would include 24 pole pairs, according to the sinusoidal waveform shown in FIG. 4.

As can be seen from the waveform shown in FIG. 4, sensor 300 generates an output signal based on a sensed magnetic field that oscillates between two extrema (e.g., a minimum and maximum) in accordance with the rotation of the encoder wheel. A processor may be configured to calculate a wheel-speed and rotation direction of the rotating encoder wheel based on the output signals generated by the sensor circuit 30.

In view of the above, a sensor signal is a measurement of the magnetic field B sensed over time t by the magnetic speed sensor 300, and oscillates between the two extrema as the magnetic encoder rotates. Furthermore, the sensor signal may have an offset from an x-axis in a y-axis direction, and may further be normalized to a common amplitude by processing performed by the sensor circuit 30.

It will be appreciated that while the examples herein describe the sine waveform as being used as speed signal and the cosine waveform as being used as direction signal, the opposite may also be true so long as the two signals are phase shifted 90° from each other.

Turning back to FIG. 3, signal paths S and D may include an ADC 32s and an ADC 32d, respectively, that convert the (differential) sensor signal of the respective signal path into a digital signal for further processing by a remaining portion of the sensor circuit 30 (e.g., by a digital signal processor 33).

The digital signal processor 33 is configured to receive the speed signal and the direction signal for further processing, including determining a rotation direction of the target object. For example, the digital signal processor 33 may include one or more processors and/or logic units that performs various signal conditioning functions, such as absolute signal conversion, normalization, linearization, frequency increase, and so forth. One or more signal conditioning functions may be performed in combination with a lookup table stored in memory. The output 31 of the digital signal processor 33 may provide one or more output signals to an external device, such as an ECU.

For example, the speed of rotation of the target object may be output as a speed pulse signal. Thus, the sinusoidal signal generated by the sensor arrangement S may be translated by the digital signal processor 33 into pulses, which may be further translated into a movement detection or a speed output. In addition, the digital signal processor 33 may output a signal that indicates a rotation direction, based on evaluating the phase shift between the speed signal and the direction signal.

Figure 5A:
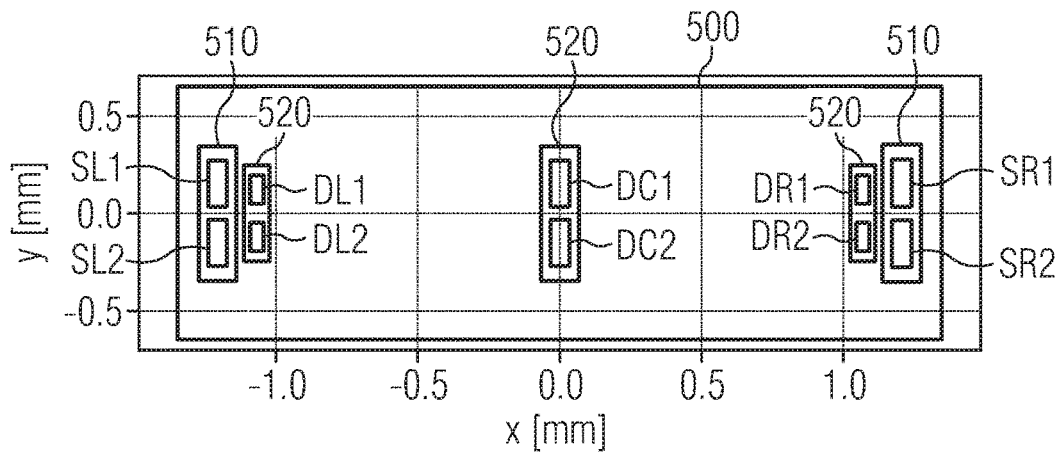
FIG. 5A shows a schematic block diagram of a speed sensor arrangement and a direction sensor arrangement of a magnetic speed sensor according to one or more embodiments.

FIG. 5A is a schematic block diagram of a speed sensor arrangement and a direction sensor arrangement of a magnetic speed sensor 500 according to one or more embodiments. The magnetic speed sensor 500 may be regarded as a sensor chip having dimensions in an x-y plane. The speed and direction sensor arrangement of the magnetic speed sensor 500 includes a speed sensor arrangement 510 configured to generate a differential speed signal and a direction sensor arrangement 520 configured to generate a differential direction signal, where each sensor arrangement 510 and 520 include sensor elements arranged in a bridge configuration. Further, for illustrative purposes, the magnetic speed sensor 500 is shown with an overlaid grid pattern that indicates a chip center of the magnetic speed sensor 500 at 0.0 and dimensions relative to the chip center towards the chip edges of the magnetic speed sensor 500.

The speed sensor arrangement 510 includes a left pair of sensor elements (SL1 and SL2) at a left position L and a right pair of sensor elements (SR1 and SR2) at a right position R. The direction sensor arrangement 520 includes a left pair of sensor elements (DL1 and DL2) at the left position L, a center pair of sensor elements (DC1 and DC2) at a center position C, and a right pair of sensor elements (DR1 and DR2) at the right position R. The left side of sensor elements and the right side of sensor elements for both sensor arrangements 510 and 520 are arranged such that left side and right side counterparts are equally spaced from the center pair of sensor elements (DC1 and DC2). Thus, the left pair of sensor elements (SL1 and SL2) are equally spaced from the right pair of sensor elements (SR1 and SR2) relative to the center pair of sensor elements (DC1 and DC2). Similarly, the left pair of sensor elements (DL1 and DL2) are equally spaced from the right pair of sensor elements (DR1 and DR2) relative to the center pair of sensor elements (DC1 and DC2).

While the center pair of sensor elements (DC1 and DC2) are shown at the chip center in this example, that may not necessarily be the case for all configurations. Instead, the center pair of sensor elements (DC1 and DC2) may be placed in a center region of the chip, but away from the chip center. Meanwhile, the sensor elements disposed on the left side of the chip may be said to be in a left region of the chip, and the sensor elements disposed on the right side of the chip may be said to be in a right region of the chip.

Regardless of whether the center pair of sensor elements (DC1 and DC2) are disposed at chip center, the respective left side and right side counterparts remain equally spaced from the center pair of sensor elements (DC1 and DC2). Thus, symmetry in sensing the magnetic field relative to the center pair of sensor elements DC1, DC2 (e.g., from the chip center) can be maintained.

As noted above, the left pair of sensor elements SL1, SL2 are equally spaced from the right pair of sensor elements SR1, SR2 relative to the center pair of sensor elements DC1, DC2 (e.g., from the chip center). Thus, complementary magnetic offset fields measured from left and right sides can be compensated. For example, the distance between the left pair of sensor elements SL1, SL2 and the right pair of sensor elements SR1, SR2 may be matched or substantially matched (e.g., within 5% to allow for manufacturing tolerances) to a pitch of a target object (e.g., an encoder wheel).

Further, each pair of sensor elements (SL1, SL2), (SR1, SR2), (DL1, DL2), (DC1, DC2), and (DR1, DR2) may be arranged such that they are also spaced equally apart in the y-dimension with respect to their paired sensor element. For example, sensor element SL1 may be the same distance from the center x-axis (0.0) as its paired sensor element SL2 is placed from the center x-axis (0.0). In this example, it may be said that each pair of sensor elements is vertically aligned in the y-dimension with respect to their paired sensor element. Thus, symmetry in sensing the magnetic field relative to the center pair of sensor elements DC1, DC2 (e.g., from the chip center) can be maintained.

In addition, the magnetic speed sensor 500 may have a sensing axis to which the sensor elements for each sensor arrangement 510 and 520 are aligned. Thus, if the magnetic speed sensor 500 has an x-sensing axis, the sensing elements SL1, SL2, SR1, SR2, DL1, DL2, DC1, DC2, DR1, and DR2 may all have their magnetization directions (i.e., reference directions) aligned with an x-sensing axis. That is, their magnetization directions may be pinned in either the x-direction or the −x-direction. The same holds true if the magnetic speed sensor 500 has a y-sensing axis or a z-sensing axis.

Figure 5B:
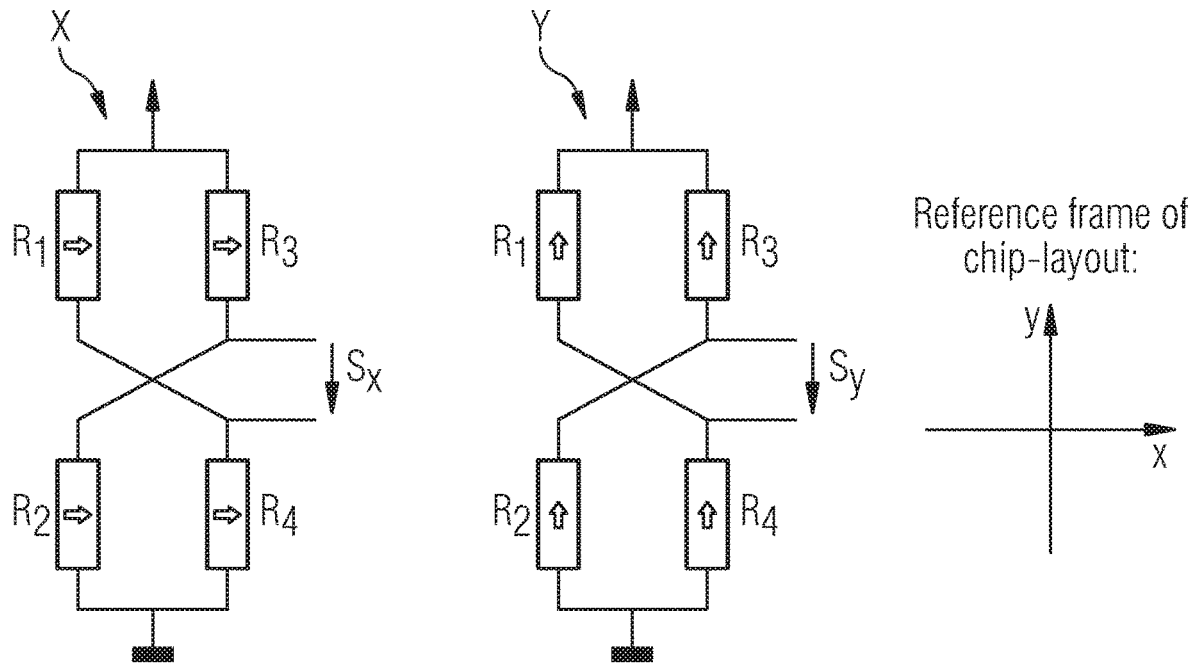
FIG. 5B shows a schematic diagram illustrating example sensor bridge configurations according to one or more embodiments.

FIG. 5B is a schematic diagram illustrating two possible sensor bridge configurations using four xMR sensor elements. For example, FIG. 5B illustrates an example of a magnetic sensor bridge circuit X that generates a differential sensor signal Sx and includes four xMR sensor elements R1, R2, R3, and R4 with arrows provided to denote a direction of a pinned-layer magnetization of each sensor element aligned in the x-direction. In this case, it can be said that the magnetic speed sensor 500 has an x-sensing axis.

The magnetic sensor bridge circuit X comprises a first magnetoresistive sensor element R1 and a fourth magnetoresistive sensor element R4. The first and the fourth magnetoresistive sensor elements R1 and R4 are connected in series. Furthermore, the magnetic sensor bridge circuit X comprises a second magnetoresistive sensor element R2 and a third magnetoresistive sensor element R3. The second and the third magnetoresistive sensor elements R2 and R3 are connected in series. The first and the third magnetoresistive sensor elements R1 and R3 are connected to a first supply terminal of the magnetic sensor bridge circuit X. The second and the fourth magnetoresistive sensor elements R2 and R4 are connected to a second, different supply terminal of the magnetic sensor bridge circuit X.

It will be appreciated that the specific pinning orientation of each pinned-layer magnetization, as shown, may be rotated by 180° as a matter of design, while remaining aligned to the x-sensing axis. The differential sensor signal Sx is compensated such that it is zero when not in the presence of an applied magnetic field.

FIG. 5B further illustrates an example of a magnetic sensor bridge circuit Y that generates a differential sensor signal Sy and includes four xMR sensor elements R1, R2, R3, and R4 with arrows provided to denote a direction of a pinned-layer magnetization of each sensor element aligned in the y-direction. In this case, it can be said that the magnetic speed sensor 500 has a y-sensing axis.

The magnetic sensor bridge circuit Y comprises a first magnetoresistive sensor element R1 and a fourth magnetoresistive sensor element R4. The first and the fourth magnetoresistive sensor elements R1 and R4 are connected in series. Furthermore, the magnetic sensor bridge circuit Y comprises a second magnetoresistive sensor element R2 and a third magnetoresistive sensor element R3. The second and the third magnetoresistive sensor elements R2 and R3 are connected in series. The first and the third magnetoresistive sensor elements R1 and R3 are connected to a first supply terminal of the magnetic sensor bridge circuit Y. The second and the fourth magnetoresistive sensor elements R2 and R4 are connected to a second, different supply terminal of the magnetic sensor bridge circuit Y.

It will be appreciated that the specific pinning orientation of each pinned-layer magnetization, as shown, may be rotated by 180° as a matter of design, while remaining aligned to the y-sensing axis. The differential sensor signal Sy is compensated such that is it zero when not in the presence of an applied magnetic field.

Figure 5C:
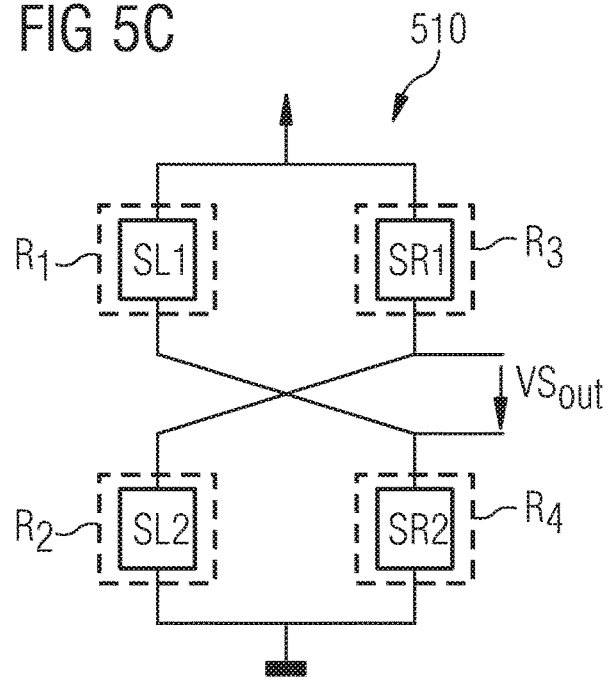
FIG. 5C shows a schematic diagram of a bridge circuit implemented by a first sensor arrangement of a magnetic speed sensor according to one or more embodiments.

FIG. 5C is a schematic diagram of a bridge circuit implemented by the sensor arrangement 510 according to one more embodiments. In particular, the sensor elements SL1, SL2, SR1, and SR2 are arranged in a bridge configuration according to one of the arrangements shown in FIG. 5B, where VSout represents a differential speed sensor signal output by the bridge circuit. The output voltage VSout is a function of the magnetic field measured at the two locations where the two pairs of sensor elements are provided.

Dashed boxes labeled R1, R2, R3, and R4 are provided for illustrative purposes to show how each of the sensor elements SL1, SL2, SR1, and SR2 correspond to positions and reference directions of the resistive elements R1, R2, R3, and R4 shown in FIG. 5B.

Figure 5D:
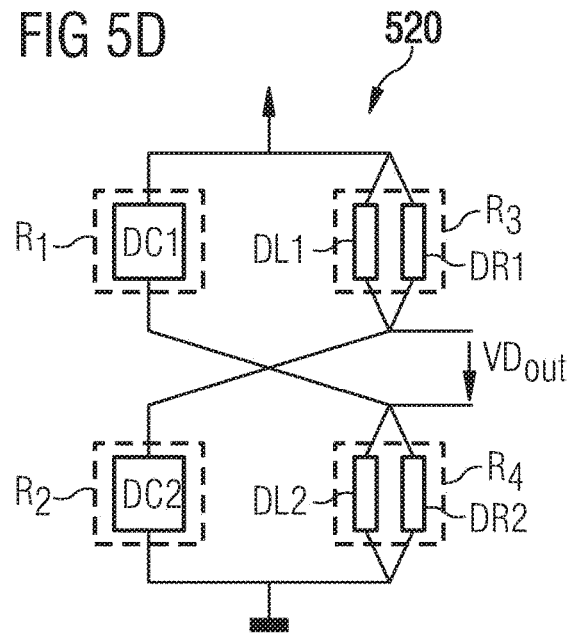
FIG. 5D shows a schematic diagram of a bridge circuit implemented by a second sensor arrangement of a magnetic speed sensor according to one or more embodiments.

FIG. 5D is a schematic diagram of a bridge circuit implemented by the sensor arrangement 520 according to one more embodiments. In particular, the sensor elements DL1, DL2, DC1, DC2, DR1, and DR2 are arranged in a bridge configuration, where VDout represents a differential direction sensor signal output by the bridge circuit. The output voltage VDout is a function of the magnetic field measured at the three locations where the three pairs of sensor elements are located.

Dashed boxes labeled R1, R2, R3, and R4 are provided for illustrative purposes to show how each of the sensor elements DL1, DL2, DC1, DC2, DR1, and DR2 correspond to positions and reference directions of the resistive elements R1, R2, R3, and R4 shown in FIG. 5B. However, instead of using four resistive elements, as in sensor arrangement 510, sensor arrangement 520 uses six resistive elements.

According to the sensor arrangement 520, one resistive half of the bridge (DC1, DC2) is placed in the center between the speed sensor pairs (i.e., between the left pair of sensor elements (SL1 and SL2) and the right pair of sensor elements (SR1 and SR2)). The other resistive half of the bridge uses the remaining resistive elements (DL1, DL2, DR1, and DR2) on the left chip position and the right chip position.

The equivalent resistance of the parallel sensor elements DL1 and DR1 is configured to be equal or substantially equal to the resistance of sensor element DC1, and the equivalent resistance of the parallel sensor elements DL2 and DR2 is configured to be equal or substantially equal to the resistance of sensor element DC2. The resistance of sensor elements DC1 and DC2 may further be configured to be equal or substantially equal to each other.

The bridge circuit of the sensor arrangement 520 includes sensor element DC1 at the R1 position, sensor element DC2 at the R2 position, sensor elements DL1 and DR1 connected in parallel to each other at the R3 position, and sensor elements DL2 and DR2 connected in parallel to each other at the R4 position. A first leg of the bridge circuit comprises the sensor elements that correspond to the R1 position (e.g., DC1) and the R4 position (DL2//DR2), and a second leg of the of the bridge circuit comprises the sensor elements that correspond to the R2 position (e.g., DC2) and the R3 position (DL1//DR1). Thus, each leg of the two legs of the bridge circuit of the sensor arrangement 520 has the same or substantially the same equivalent conductance or resistance such that each leg is in equilibrium (i.e., balanced) with the other. As a result, VDout is equal to zero when the magnetic sensor 500 is not exposed to an applied magnetic field. The bridge circuit is configured such that VDout changes linearly in response to a change in an applied magnetic field.

From an electrical performance point of view the configuration of sensor arrangement 520 behaves as a bridge circuit similar to that of the configuration of sensor arrangement 510. However, the magnetic characteristic of the sensor arrangement 520 is different in that the output voltage VDout (i.e., the differential direction sensor signal) is a function of the magnetic field measured on the three locations. For example, the function may be represented as follows: C−(L/R), where C represents the magnetic field measured at a center location, R represents the magnetic field measured at a right-side location, and L represents the magnetic field measured at a left-side location. Due to this configuration, the sensor arrangement 520 is still balanced even in the presence of complementary offset fields on the left and right side. Furthermore, the differential direction sensor signal is generated to be 90° out of phase from the differential speed sensor signal. As a result, the rotation direction may be more easily and accurately detected, with improved robustness to external stray fields.

Figure 6A:
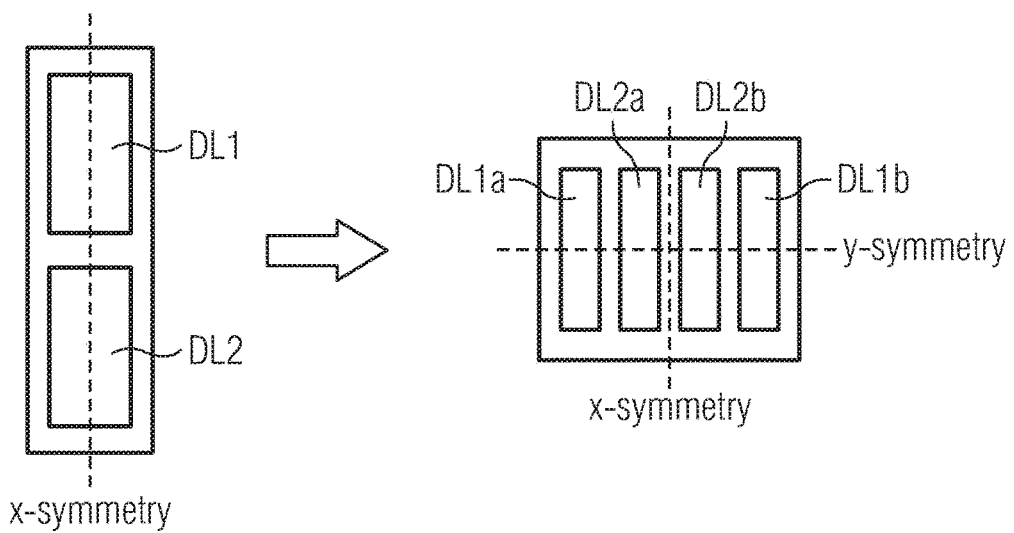
FIG. 6A is a block diagram showing sensor elements in a nested configuration according to one or more embodiments.

FIG. 6A is a block diagram showing sensor elements in a nested configuration according to one or more embodiments. Specifically, the sensor elements DL1 and DL2 shown in FIG. 5A may each be split into sub-sensor elements where DL1 is split into DL1a and DL1b, and DL2 may be split into sub-sensor elements DL2a and DL2b. Thus, if a y position is also a design factor, in addition to the x symmetry exhibited by the sensor elements shown in FIG. 5A, the placement of each of the L, C, and R sensor elements in sensor arrangements 510 and 520 can be further split into a nested configuration of parallel sub-circuits, as shown for example for sensor elements DL1 and DL2 in FIG. 6A. Here, the sensor elements DL1a and DL1b exhibit both x-symmetry and y-symmetry with respect to each other. Similarly, sensor elements DL2a and DL2b also exhibit both a-symmetry and y-symmetry with respect to each other.

Furthermore, the sensor elements of the speed sensor arrangement 510 and the direction sensor arrangement 520 can be combined in the same manner such that all four elements on one position (L or R) share the same averaged coordinates.

Figure 6B:
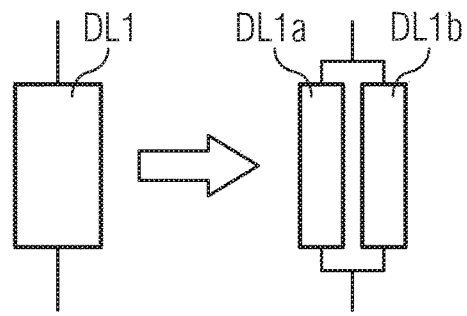
FIG. 6B is a schematic block diagram of two parallel sub-sensor elements according to one or more embodiments.

FIG. 6B is a schematic block diagram of a parallel combination of two sub-sensor elements according to one or more embodiments. In particular, one or more sensor elements shown in FIGS. 5C and 5D may be split into sub-sensor elements, as described in reference to FIG. 6A. Thus, in a circuit configuration, the corresponding sensor element in FIG. 5C or 5D may be substituted by a parallel combination of respective sub-sensor elements. For example, FIG. 6B shows how sensor element DL1, also shown in FIG. 5D, would be split into two parallel sub-sensor elements DL1a and DL1b. Thus, the parallel combination of DL1a and DL1b would replace DL1 in FIG. 5D. This substitution may be done for one or more of the resistors (i.e., the sensor elements) in FIGS. 5C and 5D.

FIG. 7 illustrates waveforms for a speed sensor signal (SPEED) and a direction sensor signal (DIR) according to one or more embodiments. In particular, due to the configuration of sensor arrangement 520, the direction sensor signal is 90° phase shifted to the speed sensor signal, and both signals are differential.

The rotation direction may be determined at each zero-crossing of the differential speed sensor signal. For example, the DSP 33 may determine whether the differential speed sensor signal has a zero-crossing on a falling edge or on a rising edge, and may further analyze the correlation to a negative value or positive value of the differential direction sensor signal.

For example, a negative value of the differential direction sensor signal at a falling edge of the differential speed sensor signal may indicate a first rotation direction. A positive value of the differential direction sensor signal at a rising edge of the differential speed sensor signal may also indicate the first rotation direction. A positive value of the differential direction sensor signal at a falling edge of the differential speed sensor signal may indicate a second rotation direction. A negative value of the differential direction sensor signal at a rising edge of the differential speed sensor signal may also indicate the second rotation direction. Since the direction sensor signal is 90° phase shifted to the speed sensor signal, the determination of rotation direction is less susceptible to error that may be cause by external stray fields, biasing noise, and other types of interference.

In addition or in the alternative, the DSP 33 may evaluate the sign of the differential direction sensor signal at each zero crossing of the differential speed sensor signal. If the sign of the differential direction sensor signal alternates between two successive zero crossings (+ − or − +), the rotation direction remains the same. However, if the sign of the differential direction sensor signal between two successive zero crossings does not alternate, (+ + or − −) a direction change is detected by the DSP 33.

According to the configuration of sensor arrangement 520, complementary magnetic offset fields from the left and the right side of the magnetic speed sensor 500 may be compensated, a 90° phase shift to the speed signal may be realized, and advantages of a bridge configuration (e.g., suppressed common mode and robustness to biasing noise) may also be achieved.

The configuration of sensor arrangement 520 may result in a reduced signal amplitude when compared to the speed signal due to the direction signal being a function of the magnetic field measured at three locations, as opposed to two locations. Further, the distance between the pairs of sensor elements of the sensor arrangement 510 being matched or substantially matched to the pitch of the encoder wheel may result in a higher signal amplitude when compared to the distance between the pairs of sensor elements of the sensor arrangement 520, which may not be matched to the pitch of the encoder wheel, mainly due to there being three pairs. However, even with the reduced signal amplitude of the direction signal, the pronounced phase shift of 90° from the speed signal and the reduced biasing noise may allow for improved rotation direction detection.

It will be appreciated that while this embodiment is described in the context of the sensor arrangement 510 being used to generate a speed signal, and the sensor arrangement 520 being used to generate a direction signal for speed sensing and direction sensing applications, the opposite may also be true. That is, the sensor arrangement 510 may be used to generate a direction signal, and the sensor arrangement 520 may be used to generate a speed signal. In addition, other applications may use the configuration of sensor arrangement 520 to replace the sensor arrangement 510 such that two or more sensor arrangements having a sensors arrangement similar to sensor arrangement 520 are used. Alternatively, one or more applications may use a single sensor bridge with an arrangement similar to that of sensor arrangement 520. Further still, it will be appreciated that the sensor arrangement 520 may be used in other applications other than speed sensing applications, and may be used in any application in which a differential magnetic field (i.e., a magnetic field with offset fields) is measured.

Sensor arrangement 520 possesses the ability to be stray field robust even in the presence of large offset fields (e.g., which are positive at the left side, negative at right side, and zero in the center), also referred to as differential magnetic fields. Thus, the differential magnetic field may have equal, but opposite, field strengths to the right and left sides of the sensor chip (i.e., where left side and right side sensor elements are provided). In a simple left-right bridge this offset fields causes the bridge to be out of equilibrium (unbalanced) which strongly reduces the stray field robustness. With the combination of left and right side sensor elements into one bridge element (e.g., elements R3 and R4 in FIG. 5D), the effect of the offset field is cancelled and the bridge remains balanced even in the presence of the offset field.

Further, while various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure. Such hardware, software, and firmware may be implemented within the same device or within separate devices to support the various techniques described in this disclosure.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A magnetic sensor, comprising:
a first bridge circuit comprising a first plurality of magnetic field sensor elements, each configured to generate a sensor signal in response to the magnetic field impinging thereon, wherein the first bridge circuit is configured to generate a first differential signal based on sensor signals generated by the first plurality of magnetic field sensor elements,
wherein the first plurality of magnetic field sensor elements include a first group of sensor elements, a second group of sensor elements, and a third group of sensor elements, wherein each of the first group of sensor elements, the second group of sensor elements, and the third group of sensor elements include two or more sensor elements,
wherein the first group of sensor elements are arranged at center region of the magnetic sensor between the second group of sensor elements and the third group of sensor elements, the second group of sensor elements are arranged at a first side region of the magnetic sensor, and the third group of sensor elements are arranged at a second side region of the magnetic sensor, opposite to the first side region, and
wherein the second group of sensor elements and the third group of sensor elements are substantially equidistant to the first group of sensor elements.

2. The magnetic sensor of claim 1, wherein the first group of sensor elements includes a first pair of sensor elements laterally spaced apart on a first axis and a second pair of sensor elements laterally spaced apart on the first axis and nested between the first pair of sensor elements.

3. The magnetic sensor of claim 2, wherein:
the first pair of sensor elements are electrically connected to each other in parallel, and
the second pair of sensor elements are electrically connected to each other in parallel.

4. The magnetic sensor of claim 3, wherein:
the first bridge circuit includes a first leg and a second leg connected in parallel between a first supply terminal and a second supply terminal,
the first leg includes the first pair of sensor elements, and
the second leg includes the second pair of sensor elements.

5. The magnetic sensor of claim 1, wherein:
the first group of sensor elements includes a first pair of sensor elements laterally spaced apart on a first axis and a second pair of sensor elements laterally spaced apart on the first axis and nested between the first pair of sensor elements,
the second group of sensor elements includes a third pair of sensor elements laterally spaced apart on a first axis and a fourth pair of sensor elements laterally spaced apart on the first axis and nested between the third pair of sensor elements, and
the third group of sensor elements includes a fifth pair of sensor elements laterally spaced apart on the first axis and a sixth pair of sensor elements laterally spaced apart on the first axis and nested between the fifth pair of sensor elements.

6. The magnetic sensor of claim 5, wherein:
the first pair of sensor elements are electrically connected to each other in parallel,
the second pair of sensor elements are electrically connected to each other in parallel,
the third pair of sensor elements are electrically connected to each other in parallel,
the fourth pair of sensor elements are electrically connected to each other in parallel,
the fifth pair of sensor elements are electrically connected to each other in parallel,
the sixth pair of sensor elements are electrically connected to each other in parallel.

7. The magnetic sensor of claim 6, wherein:
the first bridge circuit includes a first leg and a second leg connected in parallel between a first supply terminal and a second supply terminal,
the first leg includes the first pair of sensor elements, the fourth pair of sensor elements, and the sixth pair of sensor elements, and
the second leg includes the second pair of sensor elements, the third pair of sensor elements, and the fifth pair of sensor elements.

8. The magnetic sensor of claim 1, wherein:
the second group of sensor elements includes a first pair of sensor elements laterally spaced apart on a first axis and a second pair of sensor elements laterally spaced apart on the first axis and nested between the first pair of sensor elements, and
the third group of sensor elements includes a third pair of sensor elements laterally spaced apart on the first axis and a fourth pair of sensor elements laterally spaced apart on the first axis and nested between the third pair of sensor elements.

9. The magnetic sensor of claim 8, wherein:
the first pair of sensor elements are electrically connected to each other in parallel,
the second pair of sensor elements are electrically connected to each other in parallel,
the third pair of sensor elements are electrically connected to each other in parallel, and
the fourth pair of sensor elements are electrically connected to each other in parallel.

10. The magnetic sensor of claim 9, wherein:
the first bridge circuit includes a first leg and a second leg connected in parallel between a first supply terminal and a second supply terminal,
the first leg includes the first pair of sensor elements and the third pair of sensor elements, and
the second leg includes the second pair of sensor elements and the fourth pair of sensor elements.

11. The magnetic sensor of claim 1, further comprising:
a second bridge circuit comprising a second plurality of magnetic field sensor elements, each configured to generate a sensor signal in response to the magnetic field impinging thereon, wherein the second bridge circuit is configured to generate a second differential signal based on sensor signals generated by the second plurality of magnetic field sensor elements,
wherein the first differential signal is 90° phase shifted to the second differential signal.

12. A magnetic sensor, comprising:
a first bridge circuit comprising a first plurality of magnetic field sensor elements, each configured to generate a sensor signal in response to the magnetic field impinging thereon, wherein the first bridge circuit is configured to generate a first differential signal based on sensor signals generated by the first plurality of magnetic field sensor elements, wherein the first plurality of magnetic field sensor elements include a first group of sensor elements and a second group of sensor elements, wherein each of the first group of sensor elements and the second group of sensor elements include two or more sensor elements, wherein each of the first group of sensor elements is arranged on a first axis at a first region of the magnetic sensor, and wherein each of the second group of sensor elements is arranged on the first axis at a second region of the magnetic sensor that is laterally separated from the first region along the first axis.

13. The magnetic sensor of claim 12, wherein:

the first group of sensor elements includes a first pair of sensor elements laterally spaced apart on the first axis and a second pair of sensor elements laterally spaced apart on the first axis and nested between the first pair of sensor elements, and the second group of sensor elements includes a third pair of sensor elements laterally spaced apart on the first axis and a fourth pair of sensor elements laterally spaced apart on the first axis and nested between the third pair of sensor elements.

14. The magnetic sensor of claim 13, wherein:

the first pair of sensor elements are electrically connected to each other in parallel, the second pair of sensor elements are electrically connected to each other in parallel, the third pair of sensor elements are electrically connected to each other in parallel, and the fourth pair of sensor elements are electrically connected to each other in parallel.

15. The magnetic sensor of claim 14, wherein:

the first bridge circuit includes a first leg and a second leg connected in parallel between a first supply terminal and a second supply terminal, the first leg includes the first pair of sensor elements and the fourth pair of sensor elements, and the second leg includes the second pair of sensor elements and the third pair of sensor elements.

16. The magnetic sensor of claim 12, further comprising:

a second bridge circuit comprising a second plurality of magnetic field sensor elements, each configured to generate a sensor signal in response to the magnetic field impinging thereon, wherein the second bridge circuit is configured to generate a second differential signal based on sensor signals generated by the second plurality of magnetic field sensor elements, wherein the first differential signal is 90° phase shifted to the second differential signal.

17. The magnetic sensor of claim 12, wherein:

the first bridge circuit includes a first leg and a second leg connected in parallel between a first supply terminal and a second supply terminal, and the first plurality of magnetic field sensor elements are arranged in the first leg and the second leg, and the second bridge circuit includes a third leg and a fourth leg connected in parallel between the first supply terminal and the second supply terminal, and the second plurality of magnetic field sensor elements are arranged in the third leg and the fourth leg.

* * * * *